(No Model.)

D. W. COTES.
WAGON.

No. 510,241. Patented Dec. 5, 1893.

WITNESSES:
C. Neveux
Co. Sedgwick

INVENTOR
D. W. Cotes
BY Munn & Co
ATTORNEYS.

UNITED STATES PATENT OFFICE.

DAVID W. COTES, OF GUTHRIE CENTRE, IOWA.

WAGON.

SPECIFICATION forming part of Letters Patent No. 510,241, dated December 5, 1893.

Application filed June 9, 1893. Serial No. 477,047. (No model.)

*To all whom it may concern:*

Be it known that I, DAVID W. COTES, of Guthrie Centre, in the county of Guthrie and State of Iowa, have invented a new and Improved Wagon, of which the following is a full, clear, and exact description.

My invention relates to improvements in wagons; and the object of my invention is to produce a very cheap and simple wagon of great capacity, which is provided with a comparatively broad bed having a firm foundation so that, by erecting a foot-way for horses above it, scraper loads of dirt or other material may be safely deposited on the bed; also to arrange the wagon and its hauling gear in such a way that a large team of horses may be hitched close to the wagon, to the end that the wagon may be easily hauled and the team readily controlled.

To these ends my invention consists of certain features of construction and combinations of parts, as will be hereinafter described and claimed.

Reference is to be had to the accompanying drawings forming a part of this specification, in which similar figures of reference indicate corresponding parts in both the views.

Figure 1:
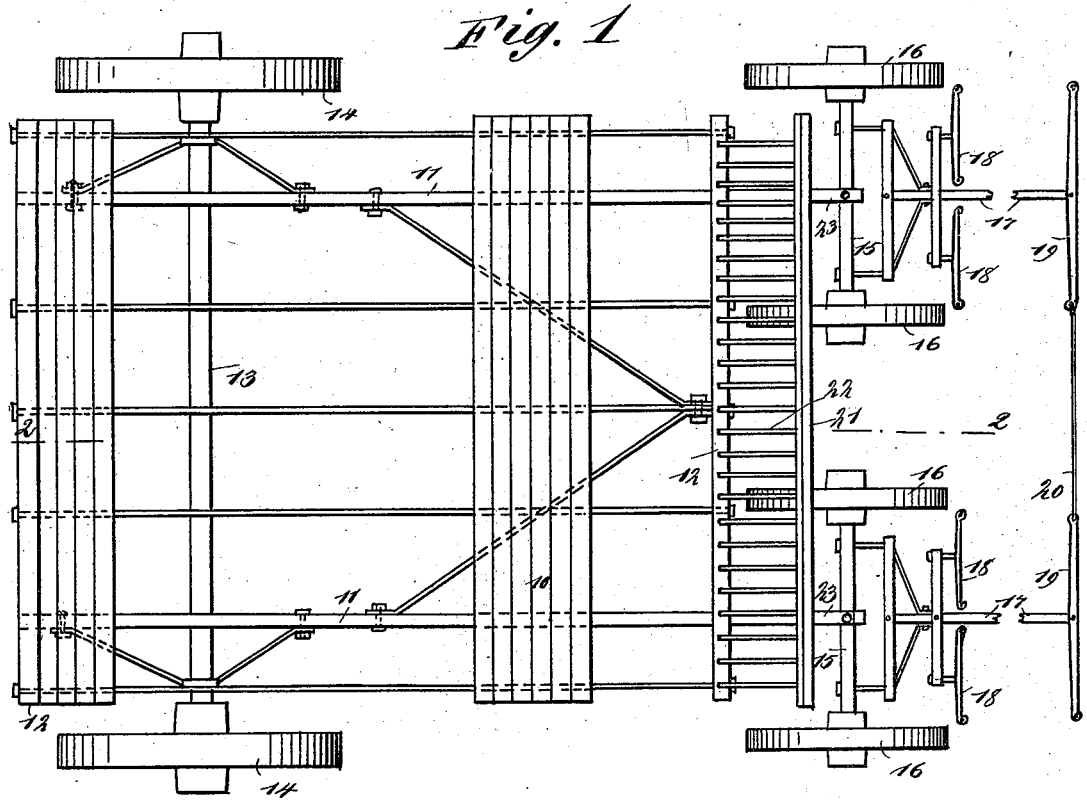
Figure 2:
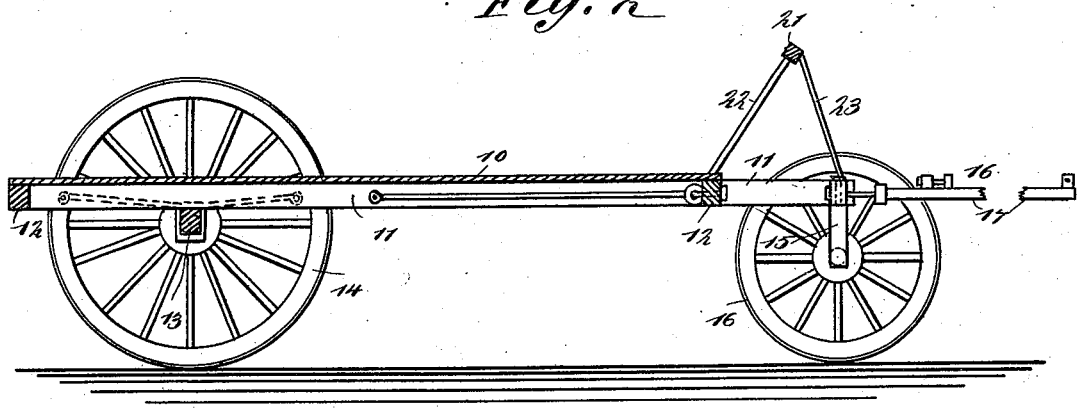

Figure 1 is a broken plan view of the wagon embodying my invention; and Fig. 2 is a longitudinal section of the same, on the line 2—2 in Fig. 1.

The wagon is provided with a bed 10, which may be constructed in any usual way, except that it is much wider than usual and has its sills 11 projected forward beyond the main portion of the bed. The bed is braced in the usual or in any convenient way, and it is provided at the ends with the customary cross pieces 12. The bed, near its rear end, is supported on an axle 13 which is mounted on wheels 14 in the usual way, and the sills 11 of the bed project forward beyond the body portion of the bed and are fastened by the ordinary king bolt to short axles 15, each of which is journaled in a pair of wheels 16, and it will be seen that this arrangement provides for a pair of wheels at each front corner of the wagon. The axles 15 are provided with forwardly-extending tongues 17 of the usual sort, and with the customary hauling gear and whiffletrees 18. The neck yokes 19 of the tongues 17 are coupled together by a rod 20 which is detachably secured to the neck yokes, and this arrangement holds the tongues 17 in parallel positions so that the horses hitched to the vehicle may pull together effectively. It will be observed that this arrangement enables four horses to be hitched abreast, and the construction described brings them very near to the load and thus enables it to be very conveniently handled.

When the wagon is used for hauling hay and other bulky material, the wagon is provided with a rack, at its forward end, comprising a cross rail 21, slats 22 extending from the cross rail to the front cross piece 12 of the wagon bed, and braces 23 secured to the cross rail and pivoted at their lower ends on the king bolt of the axles 15. This arrangement enables the bulky material to be piled up conveniently on the bed without falling over the front side and interfering with the front wheels and, if desired, a similar rack may be placed around the four sides of the bed.

Having thus described my invention, I claim as new and desire to secure by Letters Patent—

1. A wagon comprising a bed having its rear portion mounted on wheels connected by a single axle, and its front corners pivoted to independent axles mounted on independent pairs of wheels, substantially as described.

2. A wagon comprising a relatively broad bed mounted at one end on wheels on a single axle, and having at its forward corners sills projected beyond the body portion of the bed, and independent axles mounted in independent pairs of wheels and pivoted to the forwardly projecting sills of the wagon bed, substantially as described.

3. The combination, with the wagon bed mounted at one end on a pair of wheels and having forwardly-projecting sills, of independent axles mounted in wheels and arranged to support the forwardly projecting sills, tongues secured to the independent front axles, and a coupling rod connecting the free ends of the tongues, substantially as described.

4. The combination, with the wagon bed having one end mounted on wheels connected by a single axle, and the other end mounted on independent axles journaled in independent pairs of wheels, and an inclined guard rack supported on the front end of the bed and provided with braces pivoted on the front axles of the vehicle, substantially as described.

DAVID W. COTES.

Witnesses:
N. F. DRURY,
WM. C. STILES.